United States Patent [19]

Brōms et al.

[11] 4,156,898
[45] May 29, 1979

[54] DC CONVERTOR

[75] Inventors: Anders Brōms; Lennart Angquist, both of Vesteras, Sweden

[73] Assignee: ASEA Aktiebolag, Vasteras, Sweden

[21] Appl. No.: 915,837

[22] Filed: Jun. 15, 1978

[30] Foreign Application Priority Data

Jun. 27, 1977 [SE] Sweden .............................. 7707356

[51] Int. Cl.² ........................................ H02M 7/515
[52] U.S. Cl. ................................................. 363/135
[58] Field of Search ............... 307/252 M; 363/27, 96, 363/135–138

[56] References Cited

U.S. PATENT DOCUMENTS

| 3,315,145 | 4/1967 | Menard | 363/136 |
| 3,349,315 | 10/1967 | Studtmann | 363/135 |
| 3,525,923 | 8/1970 | Jensen et al. | 363/137 X |
| 3,619,759 | 11/1971 | Seki | 363/136 |
| 3,710,230 | 1/1973 | VeNard | 307/252 M X |

Primary Examiner—William M. Shoop
Attorney, Agent, or Firm—Pollock, Vande Sande & Priddy

[57] ABSTRACT

A DC convertor for converting power at a particular input voltage level to a higher or a lower voltage level and operable despite changes in the direction of power flux between the input and output voltage levels. Main switching thyristors operate in conjunction with turn-off thyristors, a commutation capacitor, magnetically coupled inductor windings and bypass diodes to define the magnitude and direction of the flow of current in the convertor and the voltage conversion ratio of the convertor.

4 Claims, 5 Drawing Figures

DC CONVERTOR

BACKGROUND OF THE INVENTION

The invention relates to a DC converter and, more particularly, to such a convertor including means for converting power at a particular input level of voltage to a higher or a lower output voltage level, and operable despite changes in the direction of power flux between the input and output voltage levels.

Direct voltage convertors are used to convert a particular input DC voltage to a different output DC voltage that may be used to power an electrical load.

One problem of prior art DC convertors has been that the voltage conversion ratio of the converter is often sensitive to variations in the convertor load current, so that fluctuations in the load current cause corresponding fluctuations in the voltage ratio.

In addition, many prior art convertors require a relatively high operational power and, therefore, are subject to relatively high losses. Such high operational power requirements also necessitate the use of more expensive electrical components, having greater weight and requiring more space.

Moreover, prior art convertors have generally required additional special switching apparatus to operate when there are changes in the direction of power flux, for example when there is feed-back to the power supplying input voltage.

Accordingly, it is an object of the invention to provide a simple and effective means to convert an input DC voltage to a higher or lower output DC voltage level.

A further object of the invention is to provide conversion means that will operate when there is a change of direction in the power flux, without requiring additional compensating switching apparatus.

Another object of the invention is to provide a DC converter that will operate at relatively low power with relatively low losses.

A further object of the invention is to provide a DC convertor that will provide a continuously controllable voltage conversion ratio that is independent of the load current.

These and other objects of this invention will become apparent from a review of the detailed specification which follows and a consideration of the accompanying drawings.

BRIEF SUMMARY OF THE INVENTION

In order to achieve the objects of the invention and to overcome the problems of the prior art, the DC convertor, according to the invention, includes means to convert power at a particular input voltage level to a higher or a lower output voltage level, and to operate despite changes in the direction of power flux between the input and output voltages.

More particularly, an embodiment of the invention includes two main switching thyristors that are connected in series across the higher voltage level and that alternately conduct to control the flow of current through the convertor. Associated with each main thyristor is a bypass or feed-back diode to conduct current in the opposite direction from the thyristor. The convertor also has auxiliary means comprising turn-off thyristors, a commutating capacitor and an inductor. The turn-off thyristors are connected in series to a commutating voltage source, and each turn-off thyristor is adapted to conduct to turn off an associated main thyristor. The commutating capacitor is connected at one end to a common point of connection between the main thyristors and at the other end to a common point of connection between the turn-off thyristors.

According to the invention the inductor has a first winding connected between the common point of connection of the main thyristors and a particular one of the main thyristors. The inductor also has a second winding magnetically coupled to the first winding and connected in series with the turn-off thyristor associated with said particular main thyristor.

Further, according to the invention, a first one of the by-pass diodes has its anode connected to a negative voltage side of the first inductor winding and its cathode connected to the positive side of the higher voltage. A second one of the bypass diodes has its anode connected to the negative side of the higher voltage and its cathode connected to the positive voltage side of the first inductor winding.

Separate embodiments of the invention operate to primarily conduct power from a higher DC voltage to a lower DC voltage or to primarily conduct power from a lower DC voltage to a higher DC voltage.

In a further embodiment of the invention the commutating voltage source is the higher one of said voltages.

DETAILED DESCRIPTION OF PREFERRED EMBODIMENTS

Figure 1:
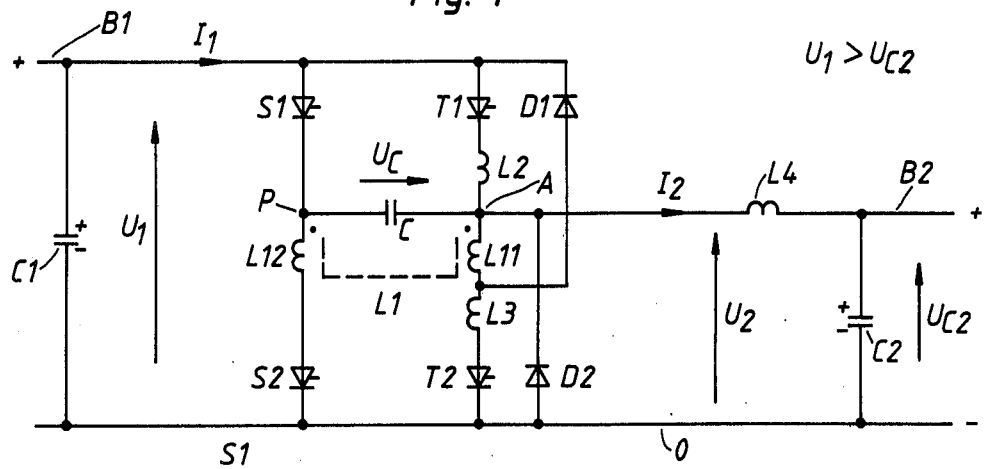
FIG. 1 shows a circuit diagram of a voltage-reducing convertor according to the invention.

The remaining portion of this specification will describe preferred embodiments of the invention when read in conjunction with the attached drawings, in which like reference characters identify identical apparatus.

FIG. 1 shows a convertor with an input conductor B1, output conductor B2 and a common conductor 0. The input conductor B1 and the input end of the common conductor 0 are connected to a DC voltage source (not shown) that generates an input voltage U1. A smoothing capacitor C1 is connected between B1 and 0 to smooth the input voltage U1.

Series coupled main thyristors T1 and T2 are connected between the conductors B1 and 0 and a tap connects a point A between the thyristors T1 and T2 to an output conductor B2. A smoothing reactor L4 is connected to the conductor B2 to smooth the output current I2, and a smoothing capacitor C2 is connected between B2 and 0 to smooth the output voltage U2.

It should be appreciated that the output conductors B2 and O may be connected to a load circuit which, for example, may include a direct voltage network or a DC motor.

The main thyristors T1 and T2 are respectively connected in series to small reactors L2 and L3 which limit the time derivative of the load current of the thyristors.

A first winding L11 of an inductor L1 is connected between the thyristor T2 and the point A, and a bypass diode D1 is connected between the input conductor B1 and the negative voltage side of the winding L11. A second bypass diode D2 is connected between the common conductor 0 and the point A.

Turn-off thyristors S1 and S2 are connected in series between the conductors B1 and 0 and a commutating capacitor C is connected between the point A and a point P that lies between the thyristors S1 and S2. A second winding L12 of the inductor L1 is connected in series with the thyristor S2 between the point P and the common conductor 0.

In a manner known to the art, a control pulse device described below is arranged to alternately turn on the main thyristors T1 and T2 and to turn off the main thyristors by turning on their respective turn-off thrysitors S1 and S2. Thus, by varying the relation between the on-state times of the two main thyristors, an input voltage U1 may be converted to a particular lower output voltage U2 at a particular output current I2, to drive a load network.

Figure 2:
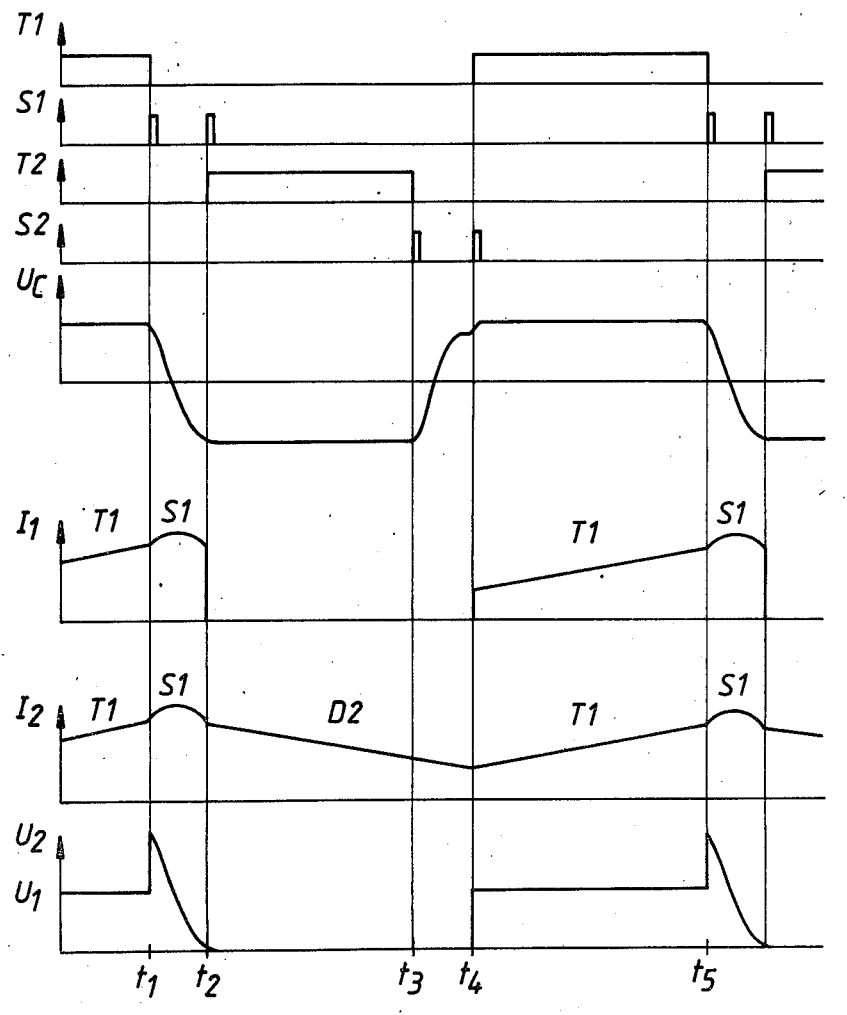
FIG. 2 shows plots of the operational signals of the circuit of FIG. 1.

FIG. 2 illustrates various timing diagrams for the signals associated with the circuit of FIG. 1. More particularly, FIG. 2 illustrates the time relation of the operational signals of the thyristors T1, T2, S1 and S2 with respect to the commutating capacitor voltage UC, the input current I1, the output current I2 and the output voltage U2. The plots of the input current I1 and the output current I2 show the circuit components that conduct I1 and I2 at a particular time.

With reference to FIG. 2, prior to a time t1, the main thyristor T1 is conducting and the commutating capacitor C is charged to a positive voltage. At a time t1, an ignition pulse is applied to the turn-off thyristor S1, to turn S1 on and to thereby turn T1 off. Since the main thyristor T1 has been turned off, the input current I1 flows through the turned on thyristor S1 to the commutating capacitor C, which is thereby charged to a particular negative polarity.

At a time t2, the voltage at point A reaches the potential of the conductor 0, the thyristor S1 becomes non-conducting, and the diode D2 begins to conduct current. In addition, the main thyristor T2 may be turned on and a short ignition pulse may be applied to the thyristor S1 to ensure a complete charging of the commutating capacitor C. Furthermore, the input current I1 drops to zero and the output current I2 begins to decrease as the energy that is stored in the inductor L4 is supplied to the output of the convertor circuit. It should be understood that if the load current changes direction, the current will commutate from D2 to T2.

At a time t3, an ignition pulse is applied to the turn-off thyristor S2 and the main thyristor T2, if conducting, is thereby turned off. As T2 is turned off and S2 is turned on, the commutating capacitor C begins charging to an opposite positive polarity.

It should be appreciated that since the inductor windings L11 and L12 are magnetically coupled, the main thyristor T2 will be rapidly turned off and, after the thyristor T2 is turned off, the reactor, including the winding L12, will form an oscillating circuit with the capacitor C to reverse the charge on the capacitor. Because of losses in the oscillating circuit, the positive capacitor charge may be slightly lower after the reversion than was the case initially. Therefore, at a time t4, a short ignition pulse is applied to the thyristor S2 at the same time that T1 is turned on, in order to provide an additional incremental charge to the capacitor C to return the capacitor to its fully charged state.

At a time t5, an ignition pulse is again applied to the thyristor S1 to turn off the main thyristor T1 to complete a period of the work cycle.

As explained above, FIG. 2 indicates the circuit components that carry the input and output current I1 and I2 during different portions of the work cycle. Thus, it can be seen that the main thyristor T1, the turn-off thyristor S1 and the diode D2 are the components that carry most of the current in the circuit. Since the main thyristor T2, the turn-off thyristor S2, and the inductor coils L11 and L12 carry either very little current or no current, it should be appreciated that these components can be dimensioned for low current carrying capacity and for a low rated power. Thus, these low power components, and the inductor L1 in particular, have the advantage of low losses and relatively low cost, weight and space requirements.

However, it should be appreciated that if the load that is connected to the output conductor B2 and the common conductor 0 has a natural E.M.F., the load could temporarily feed back power to change the direction of the power flux when the voltage U2 is reduced. Thus, I2 and I1 would then become negative and the main thyristor T2 and the diode D1 would carry the current for the circuit. In such a case, the winding L11 of the inductor L1 would pass the load current of the circuit and would, therefore, require increased current carrying capacity to accommodate the additional current.

Figure 3:
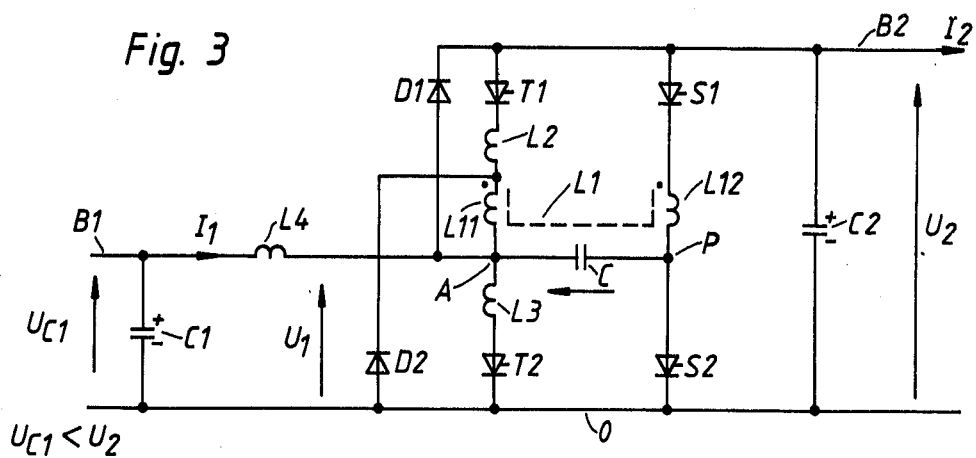
FIG. 3 shows a circuit diagram of a voltage-increasing convertor according to the invention.

FIG. 3 shows an alternative embodiment of the invention that is intended to be used in a voltage-increasing convertor, where power generally flows from a lower voltage level U1 to a higher voltage U2. The main features of the circuit of FIG. 3 correspond to the above-described features of the circuit of FIG. 1, and the operation of the circuit of FIG. 3 is substantially the same as the feed-back operation of the circuit of FIG. 1.

As shown in FIG. 3, an input voltage U1 is connected to a point A between the main thyristors T1 and T2 by means of an input conductor B1 and a reactor L4. The main thyristors T1 and T2 and the turn-off thyristors S1 and S2 are connected between the output conductor B2 and the common conductor 0 which distribute an output voltage U2 that is greater than the input voltage U1 of the convertor.

The circuit of FIG. 3 differs from the circuit of FIG. 1 in that the windings L11 and L12 of the inductor L1 of FIG. 3 are connected to the positive side of the points A and P rather than the negative side of the points, as provided in FIG. 1. However, despite the reverse polarity connection of the windings L11 and L12, it should be understood that, as in FIG. 1, the cathode of the diode D2 of FIG. 3 is connected to the positive voltage side of the winding L11 and the anode of the diode D1 of FIG. 3 is connected to the negative voltage side of the winding L11.

Figure 4:
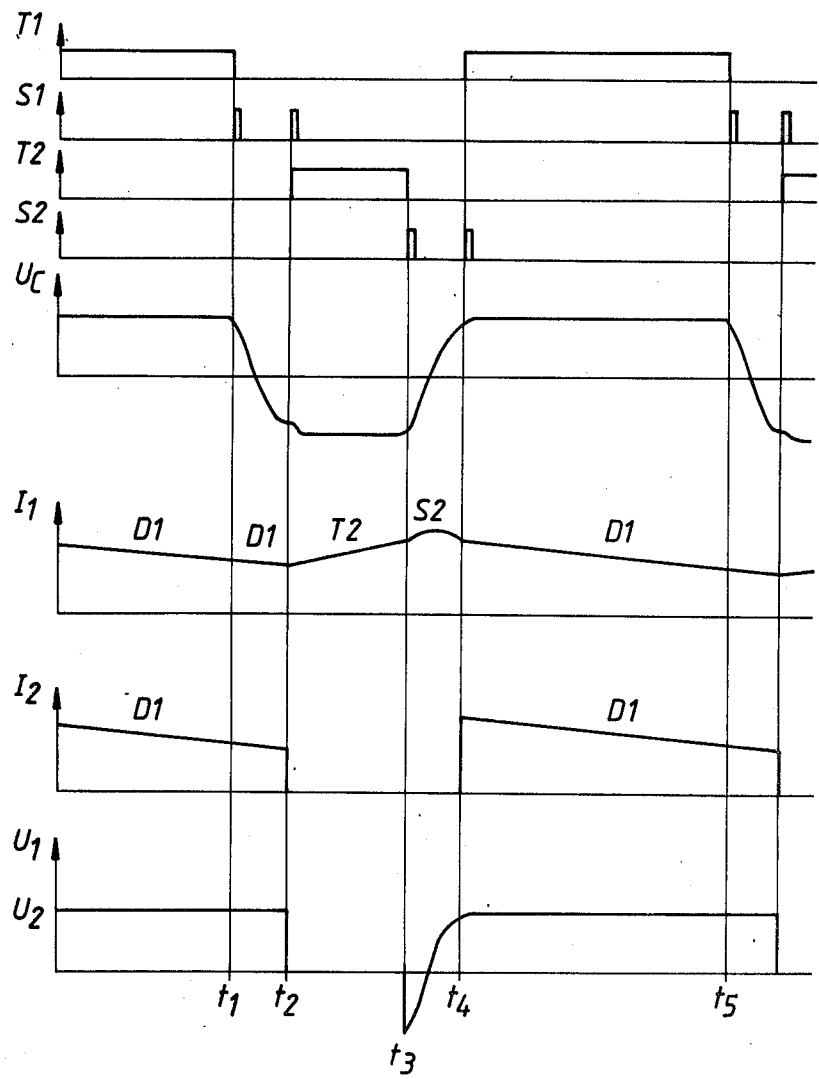
FIG. 4 shows plots of the operational signals of the circuit of FIG. 3.

The thyristors T1, T2, S1 and S2 are controlled by respective control pulse devices as provided for the circuit of FIG. 1. FIG. 4 illustrates the time relation between the operational signals of the thyristors of the circuit of FIG. 3 and the commutating capacitor voltage UC, input and output currents I1 and I2, and input voltage U1.

At a time t1, the turn-off thyristor S1 is turned on and the main thyristor T1 is thereby turned off. Thus, the charge on the commutating capacitor C is reversed through S1, L12 and D1 and the capacitor C is charged to a value that may be somewhat less than its maximum possible charge. A short ignition pulse is therefore at time $t_2$ applied to the thyristor S1 to incrementally increse the charge on the capacitor C and to thereby increase the associated voltage UC to a maximum value.

At a time $t_2$, the main thyristor T2 is turned on and an increasing input current flows through the input conductor B1, the inductor L4, point A, the inductor L3, the conducting thyristor T2, and the common conductor 0.

At a time $t_3$, the turn-off thyristor S2 is turned on and the main thyristor T2 is thereby turned off. The input current I1 then flows through the inductor L4, point A, capacitor C, the conducting thyristor S2, and the common conductor 0, to recharge the capacitor C. When the voltage across the charging capacitor UC is equal to U2, the thyristor S2 is turned off and the diode D1 becomes conducting.

The conducting diode D1 conducts a decreasing current from the inductor L4 to the output conductor B2. Of course, it should be understood that if the load current changes direction, the current will commutate from D1 to T1.

At a time $t_4$, the main thyristor T1 is turned on and thus, it should be appreciated that only the diode D1, the thyristor T2 and to some extent the thyristor S2 are used to carry the load current in the normal direction of power. As described above for the circuit of FIG. 1, the windings L11 and L12 will conduct either no current or very little current and, therefore, the rated power and loss of the inductor L1 will be small.

It should be further appreciated that the ratio of the input voltage and the output voltage of the circuit of FIG. 3 is continuously controllable as is the voltage ratio for the circuit of FIG. 1. In addition, the circuit of FIG. 3 may be employed to operate where there is a change of direction of power flow. Of course, if feedback does occur, the inductor winding L11 will conduct the corresponding load current and the operational dimensions of the inductor will, therefore, have to be increased.

Figure 5:
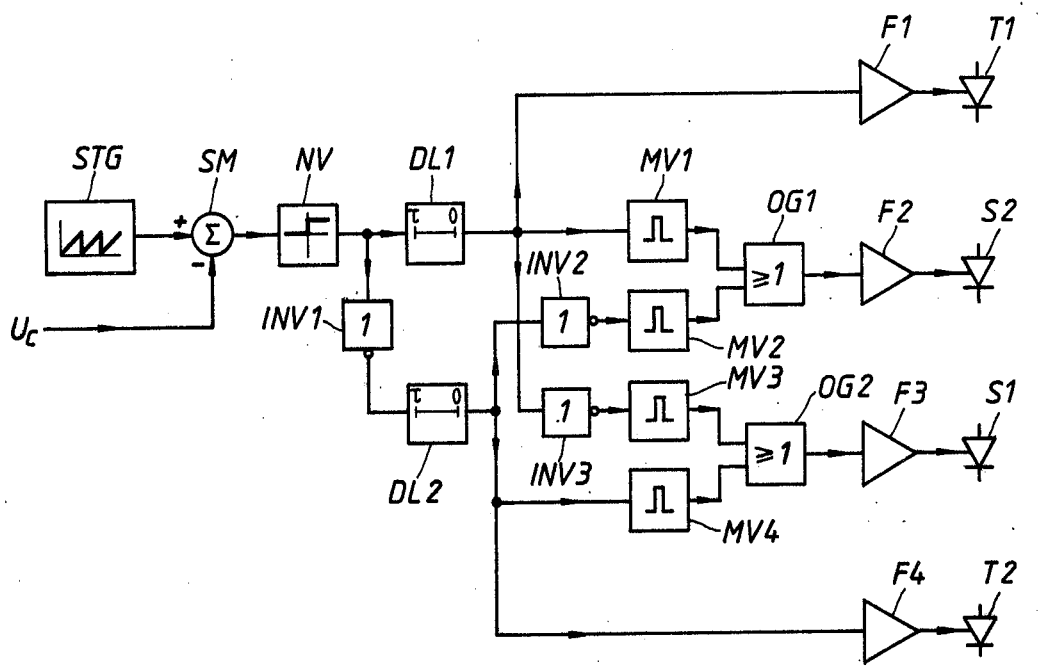
FIG. 5 shows a circuit diagram of a control pulse device for the convertors of FIGS. 1 and 3.

FIG. 5 shows a circuit diagram of a control pulse device for firing the thyristors of either of the convertors of FIGS. 1 and 3 and for controlling the convertor output voltage. A saw-tooth generator STG generates a positive saw-tooth signal at the desired operating frequency of the convertor. Its output signal is supplied to a summing means SM. To an inverting input of the summing means a positive control signal $U_c$ is supplied. The summing means generates a signal corresponding to the difference between the saw-tooth signal and the control signal $U_c$. This difference signal is supplied to a level detector NV, the output signal of which is a logical "1" if said difference is positive, and a logical "0" if the difference is negative. The output signal of NV is supplied to a delay means DL1, and also through an inverting circuit INV1 to a second delay means DL2. When the input signal to one of said delay means goes from "0" to "1", the output signal of the delay means goes from "0" to "1" after a fixed delay $\tau$. When the input signal of a delay means goes from "1" to "0", however, its output signal instantly goes from "1" to "0". The delay time $\tau$ is equal to the time intervals $t_1$-$t_2$ and $t_3$-$t_4$ of FIGS. 2 and 4.

The output signal of delay means DL1 is supplied to an amplifying means F1, to a monostable circuit MV1 and, through an inverting circuit INV3, to a monostable circuit MV3.

The amplifying means F1 comprises power amplifying means for converting the low level signal supplied thereto to a firing signal of sufficient power level to fire thyristor T1. The amplifying means may also comprise potential separating means, for instance pulse transformer, as the thyristor may be situated at a potential level different from that of the control pulse device.

Similar amplifying means F2, F3 and F4 are provided for generating firing signals to thyristors S2, S1 and T2, respectively.

The monostable circuit MV1 and the similar monostable circuits MV2, MV3 and MV4 generate short output pulses when their input signals change from "0" to "1", said output pulses having a length corresponding to the length of the short firing pulses supplied to the turn-off thyristors S1 and S2 at times $t_1$, $t_2$, $t_3$ etc. (see FIGS. 2 and 4).

The output signal of delay means DL2 is supplied to amplifying means F4, to monostable circuit MV4, and, through an inverting circuit INV 2, to monostable circuit MV2.

The output pulses from circuits MV1 and MV2 are supplied to an OR gate OG1, and the output pulses from circuits MV3 and MV4 are supplied to a second OR gate OG2. The output signals from OR gates OG1 and OG2 are supplied to amplifying means F2 and F3, respectively.

The operation of the control pulse device will now be described

The control signal $U_c$ may be varied between lower and upper limits, which may be approximately equal to zero and the maximum value of the saw-tooth voltage, respectively. When the saw-tooth voltage starts increasing from zero, the output signal of the summing means SM will in general be negative and the output of the level detector NV will be "0". After a certain time, the length of which depends on the value of the control signal $U_c$, the saw-tooth signal becomes larger than the control signal and the output signal from the level detector NV goes from "0" to "1".

At time $t_1$ (see FIGS. 2 and 4) the saw-tooth voltage goes abruptly to zero. The output signals of the level detector NV and the delay means DL1 will instantly become "0", and the firing signal previously supplied to T1 is terminated. A short pulse is supplied to turn-off thyristor S1 through circuits INV3, MV3, OG2 and F3, and thyristor T1 is turned off.

At time $t_1$ the output signal of inverter INV1 becomes "1" and after a time interval $\tau$, at time $t_2$, the output signal of delay means DL2 becomes "1". Through circuits MV4, OG2 and F3 a second short firing pulse is then supplied to thyristor S1, and a firing signal is also supplied to thyristor T2 through the amplifying means F4.

At time $t_3$ the saw-tooth voltage has reached and starts to exceed the control signal $U_c$. The output signal from the level detector NV then becomes "—1". The output signals of units INV1 and DL2 instantly become "0" and the firing signal to thyristor T2 is terminated. At the same time the output signal of the inverter INV2 becomes "1" and a short firing pulse is supplied to the turn-off thyristor S2 through units MV2, OG1 and F2. The thyristor T2 is thereby turned off.

After a time interval $\tau$ the output signal of delay means DL1 becomes "1". This occurs at time $t_4$. A firing signal is then supplied to thyristor T1. At the same time a second short firing pulse is supplied to thyristor S2 through units MV1 and OG1.

By varying the control voltage $U_c$ the relation between the lengths of the conducting intervals of thyristors T1 and T2 may be varied and thereby the output voltage of the convertor.

It should be understood that the above-described embodiments do not limit the convertor of the invention to the particularly described circuit design. For example, although the circuits of FIG. 1 and FIG. 3 illustrate a common conductor 0 that is connected to the negative poles of the input and output voltages, a circuit in accordance with the invention could include a common conductor that is, instead, connected to the positive poles of the voltages.

In addition, the input capacitor C1 could be omitted if the voltage supply network has a low internal impedance and is insensitive to AC components in the transmitted direct current. Likewise, the output capacitor C2 could be omitted.

Furthermore, although the inductor L4 has an essential function, particularly in connection with the circuit of FIG. 3, the inductor could be omitted if the network or load connected to the low-voltage side of the convertor has a sufficiently high internal inductance.

Moreover, in FIGS. 1 and 3, the turn-off thyristors S1 and S2 are connected between the conductors that are connected to the higher voltage level, causing the higher voltage to act as a commutating voltage source. However, if this higher voltage varies considerably, it might be preferable to connect the turn-off thyristors to a separate commutating voltage source that has a more constant voltage.

It should be understood that the convertor according to the invention offers several important advantages over convertors presently known to the art. For the voltage ratio of the convertor circuit of the invention is continuously controllable and is independent of the load current. In addition, the circuit of the invention does not require special switching apparatus to compensate for changes in the direction of power flux, for example, when there is feed-back to the power supplying network.

Moreover, the magnetic coupling between the two windings of the inductor L1 provides means to rapidly turn off the main thyristors T1 and T2 with a minimum consumption of commutating capacitor energy. Thus, the commutating capacitor can have relatively small operational dimensions. Also, the arrangement of the inductor windings in conjunction with the particular connection of the diodes D1 and D2 provides a well-defined and load-independent means for limiting the voltage of the commutating capacitor. Thus, the voltage rating of the capacitor may be reduced and the maximum stresses on the thyristors and therefore the corresponding voltage rating of the thyristors may also be reduced.

In applications where the power flux does not change direction, the inductor windings L11 and L12 will conduct either no current or very little current and, therefore, the inductor windings may have a low rated power and inductor losses will be correspondingly low. Of course, even if the rated power of the inductor is increased in those cases where temporary feed-back may occur, the same advantages are obtained although to a reduced extent.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalence of the claims are therefore intended to be embraced therein.

What is claimed is:

1. A direct voltage convertor for converting direct voltage power between a higher voltage and a lower voltage comprising:
    at least two main switching thyristors connected in series across said higher voltage to alternately conduct to control the flow of current between said higher and said lower voltages;
    at least two turn-off thyristors connected in series to a commutating voltage source, each turn-off thyristor operatively associated with a main switching thyristor to conduct to turn off said associated main thyristor;
    a commutating capacitor connected at one end to a common point of connection between said main thyristors and at the other end to a common point of connection between said turn-off thyristors;
    a first inductor winding connected between the common point of connection of said main thyristors and a particular one of said main thyristors;
    a second inductor winding magnetically coupled to said first winding connected in series with the turn-off thyristor associated with said particular one main thyristor;
    a first diode operatively associated with a main thyristor to bypass current, said first diode having its anode connected to a negative voltage side of said first winding and its cathode connected to a positive side of said higher voltage; and
    a second diode operatively associated with the other main thyristor to bypass current, said second diode having its anode connected to the negative side of said higher voltage and its cathode connected to a positive voltage side of said first winding.

2. The direct voltage convertor of claim 1, for conducting power primarily from the higher voltage to the lower voltage, further comprising a conductor common to said higher voltage and said lower voltage, means for connecting said first inductor winding between said common point of the main thyristors and said common conductor.

3. The direct voltage convertor of claim 1, for conducting power primarily from the lower voltage to the higher voltage, further comprising a conductor common to said higher voltage and said lower voltage, means for connecting said first inductor winding between said common point of the main thyristors and the side of said higher voltage which is not connected to said common conductor.

4. The direct voltage convertor of claim 1 wherein said commutating voltage source is said higher voltage.

* * * * *

UNITED STATES PATENT AND TRADEMARK OFFICE
CERTIFICATE OF CORRECTION

PATENT NO. : 4,156,898
DATED : May 29, 1979
INVENTOR(S) : Anders Bröms and Lennart Ängquist It is certified that error appears in the above-identified patent and that said Letters Patent are hereby corrected as shown below:

Inventors: Anders Bröms; Lennart Ängquist, both of Västerås, Sweden

Signed and Sealed this

Twenty-eighth Day of August 1979

[SEAL]

Attest:

LUTRELLE F. PARKER

Attesting Officer     Acting Commissioner of Patents and Trademarks